Aug. 7, 1956  H. LECOURBE  2,757,988
BALL AND THE LIKE BEARINGS, SPECIALLY FOR CONVEYORS
Filed Dec. 11, 1953  2 Sheets-Sheet 1
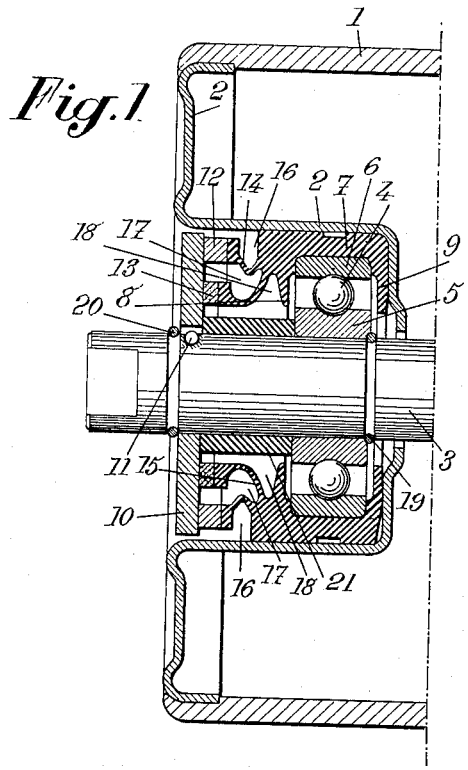
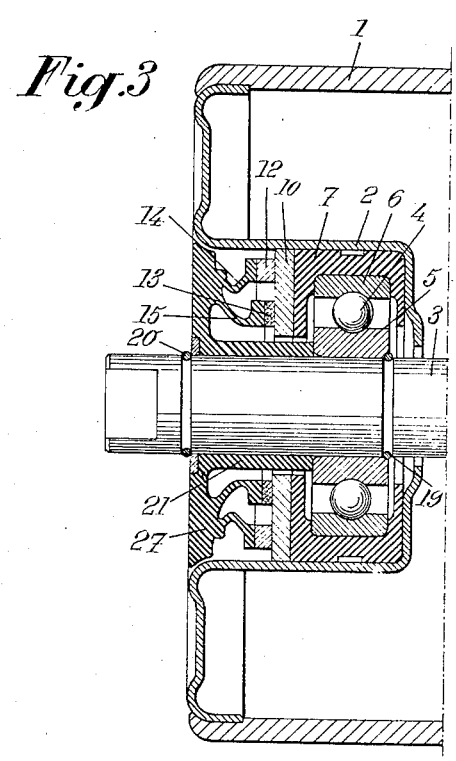
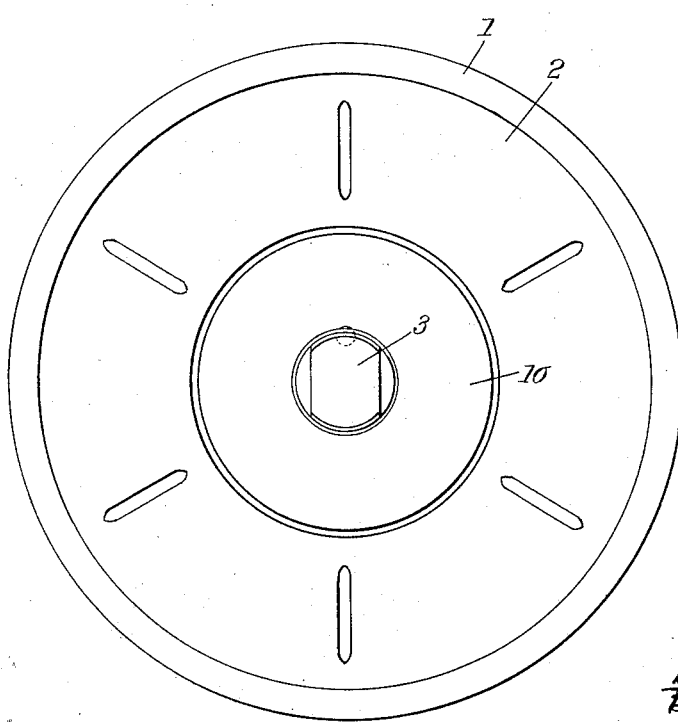
INVENTOR:
HENRI LECOURBE
BY:
Bailey, Stephens & Huettig
ATTORNEYS

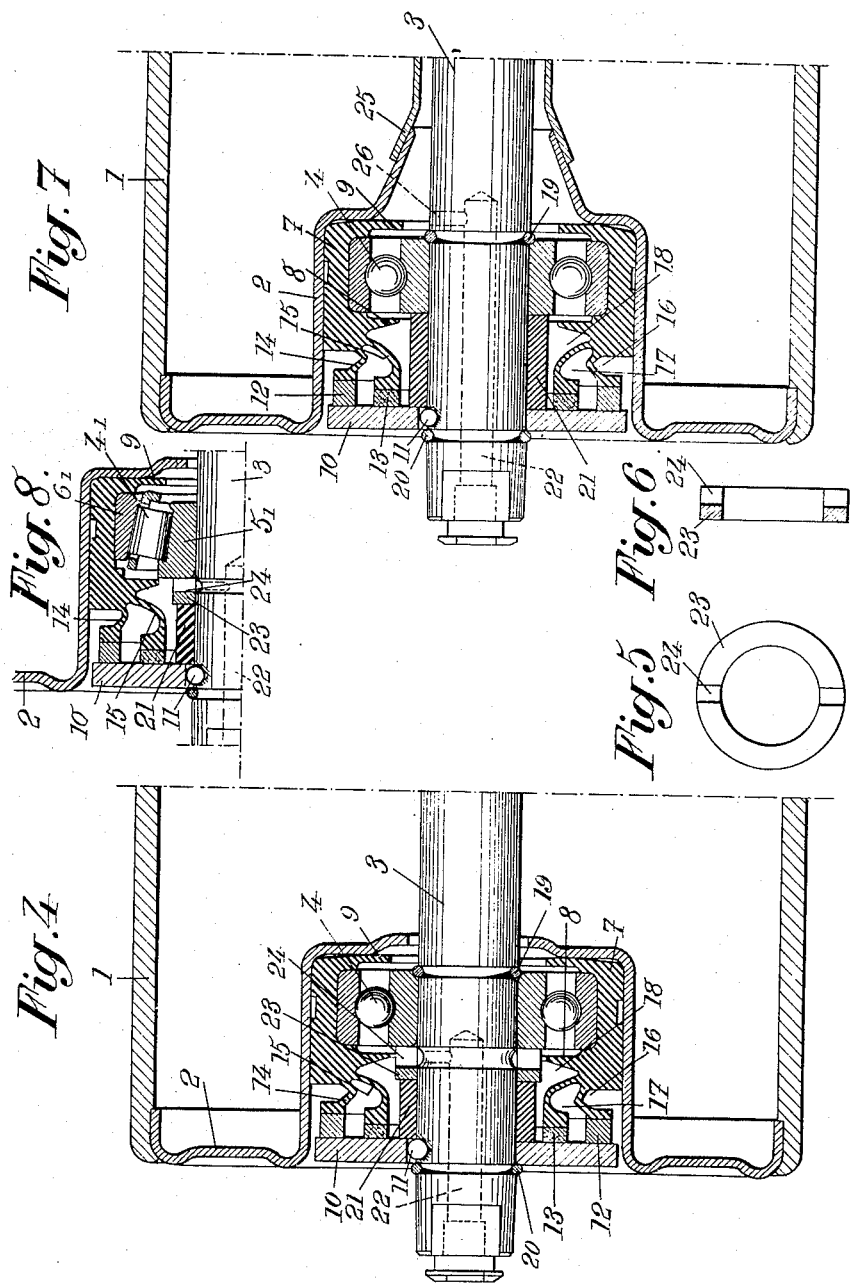

United States Patent Office 2,757,988
Patented Aug. 7, 1956

2,757,988

BALL AND THE LIKE BEARINGS, SPECIALLY FOR CONVEYORS

Henri Lecourbe, Saint-Quentin, France, assignor to "Etablissements Metallurgiques Boyer," Saint-Quentin, France, a society of the Republic of France Application December 11, 1953, Serial No. 397,710

Claims priority, application France March 21, 1953

5 Claims. (Cl. 308—20)

My present invention has for its object improvements in ball and the like bearings fitted between two parts revolving with reference to each other and the expression "ball bearing" should be construed in its most general sense as covering ball, roller and needle bearings, including cylindrical or frustoconical races and even bearings having smooth surfaces, and my invention covers more specifically, because they seem to be of a major interest in this case, although they should not be considered as an exclusive application, those bearings which are intended to be used in an atmosphere laden with dust, e. g. the bearings of conveyors including a belt made of elastic material, rubber or the like, and handling loose material.

The invention has for its chief object bearings of this type which satisfy better than hitherto the different requirements of practice, inasmuch as they are better protected against dust and consequently less subject to wear.

According to a primary object of my invention, the improved bearing includes fluidtight means constituted by frictionally acting members the operative surfaces of which extend transversely with reference to the axis of the bearing.

In addition to this main feature, various other features to be disclosed hereinafter with further detail, may be associated advantageously therewith and, in particular, In the case of bearings provided with fluidtight means including friction rings or the like parts, as referred to hereinabove, said rings may be submitted to an elastic pressure exerted by a support made of elastic material and carried by the actual bearing;

In the case of the bearings referred to as including friction rings, it is possible to provide a plurality of such friction rings forming a coaxial series and constituted by materals such as graphite or felt, said rings being preferably associated with expansion chambers which may be constituted by walls or diaphragms forming part of the above mentioned elastic support when such a support is resorted to.

According to a last feature, more particularly intended for the case of ball bearings, roller bearings or needle bearings, one of the races of each bearing is adapted to rest on an annular support made of elastic or yielding material and including extensions which may serve for the production of the desired elastic pressure to be exerted on the friction rings, as mentioned hereinabove.

My invention covers more particularly certain applications, e. g. the application of the bearings carrying the rollers of belt conveyors, and also certain embodiments of such bearings, and it has for its object the novel articles of manufacture constituted by the bearings of the type referred to and incorporating the above features and further, the special parts used in their execution and the belt conveyors and the like systems including such bearings.

My invention will be readily understood from the reading of the following description, reference being made to accompanying drawings illustrating various embodiments of the invention, said description and drawings being given obviously only by way of exemplification. In said drawings:

Figs. 1 and 2 are respectively an axial cross-section of a part of a ball bearing executed in accordance with the invention and an end view of a roller for a belt conveyor incorporating said ball bearing;

Figs. 3 and 4 are views similar to Fig. 1 of two further embodiments of my invention;

Figs. 5 and 6 illustrate in front view and cross-sectionally respectively, one of the parts incorporated into the arrangement of Fig. 4;

Fig. 7 is a view similar to Fig. 4 of a still further embodiment;

Lastly, Fig. 8 is a cross-sectional view of a modification, as applied to a roller bearing with frusto-conical races.

According to the invention and, particularly, according to the application and embodiment of its various parts which appear to be the most advantageous at the present moment, it is possible to execute rollers for conveyors of the rubber belt type carrying loose material, as follows:

Attention will first be drawn to the unfavorable conditions of operation of such rollers. As they are constrained to revolve in the presence of an atmosphere laden with abrasive and corrosive dust, the introduction of such dust inside the bearings leads to a rapid wear and also to an increase of the resistant torque. Now, this torque has an action of prime importance in conveyors of this type which may include, in the case of plants having a length of a magnitude of 100 meters, a very large number of rollers, say 350, and this leads to a considerable increase in the power required for the driving of the conveyor.

It is also necessary to take into account the violent and repeated shocks due to the action of the loads which are being handled, said shocks exerting a rapidly destructive action on the bearings.

To remove these drawbacks, I resort, in accordance with the invention, to the arrangement disclosed hereinafter and which may be used in various manners in the different cases of industrial application.

My improved conveyor rollers, considered in their general arrangement, may be designed in any desired manner and assume any shape suiting the proposed application. I have, therefore, illustrated in the drawings said rollers by way of example as being each bounded outwardly by a cylindrical sleeve 1 and as provided at each end with a ferrule 2 formed e. g. by a stamped metal insert, welded or otherwise secured to form a terminal member on the cylindrical sleeve 1, said terminal section being adapted to house the bearings to be fitted between the roller 1—2 and the central carrier shaft 3, said bearings being preferably of the ball bearing type; the balls are shown at 4 while 5 and 6 designate respectively the inner and outer races of the ball bearing illustrated.

In order to ensure an elastic suspension of the conveyor rollers on the shaft 3 and also for reasons which will appear hereinafter, I insert first, between the inner wall of each ferrule housing 2 and the outer wall of the corresponding ball bearing, a packing sleeve of rubber or the like elastic material 7 capping the outer race 6.

Preferably, said packing 7 assumes the shape of a sleeve the axial cross-section of which is U-shaped so that the race 6, when it has been fitted in position, is protected laterally with the whole bearing by the lateral flanges 8 and 9 of the support constituted by the packing sleeve 7.

The packing sleeve 7 may be formed by a single part, in which case it is fitted over the bearing 4—5—6 by a transient deformation of the elastic material forming it; it is also possible to resort to a two-part sleeve packing.

It is of advantage to design the sleeve 7 made of rubber or the like yielding material, in a manner such that when the bearing system is fitted over the shaft 3 inside the ferrule or housing 2, said sleeve may be submitted to an at least slight compression so that it may be rigid with the inner wall of the housing by reason of the friction exerted by it against the said wall, and consequently with the entire roller 1; however, any other securing means may be substituted for that which has been disclosed.

Starting from such a system or any other equivalent system, which already protects to a certain extent each of the bearings to be considered, I provide, furthermore, special means preventing the entrance of dust, water and the like into said bearings, said means being designed in a manner such that they include frictionally operating members the operative surfaces of which extend transversely with reference to the axis of the roller and of the shaft, while fluid-tightness is provided by the pressure arising between the cooperating bearing surfaces, said pressure being produced either through conventional elastic means or through the application of diaphragms made of rubber or the like yielding or plastic material, in which case it is of interest to resort to extensions of the above mentioned sleeve 7, said extensions being directed towards the cooperating surfaces to form said diaphragms.

Thus, in the embodiment illustrated in Figs. 1 and 2, and also in the embodiments illustrated in Figs. 4 and 7, the dust-preventing means are designed in a manner such that a member revolving in unison with the roller ensures fluidtightness by bearing against a washer 10 rigidly secured to the shaft 3. This solution of the problem by means of a stationary washer appears advantageous since, by reason of the rotation of the cooperating rotary member, the dust and the like objectionable material is urged centrifugally outwardly.

The washer 10 may be keyed to the shaft at 11, for instance by a ball, a cotter, a pin or the like means, while the cooperating rotary members engaging the surface of the washer 10, are advantageously constituted by the two concentric rings 12 and 13, of which the outer ring 12 is preferably made of graphite and serves as a primary filter, and the inner ring 13 is made for instance of felt having a basis of nylon or the like fibrous material, said inner ring serving as a second filter for the finer particles of dust.

The elastic engagement between the rotary rings 12 and 13 and the washer 10 is obtained through two annular elastic diaphragms 14 and 15 to which said rings are glued for instance, and which are preferably integral with the sleeve 7, the diaphragm system disclosed defining three coaxial and independent dust-collecting or expansion chambers, 16, 17 and 18.

Said diaphragms 14 and 15 act as weak springs adapted to compensate for any play within large limits and they provide for fluidtightness without producing any exaggerated friction.

The frictional action is, furthermore, reduced if care is taken, in accordance with a preferred embodiment, to give the washer 10, at least on its operative surface, a polish as perfect as possible. To this end for instance, after a very fine grinding of the surfaces of the washer, a chromium coat is deposited preferably over both outer surfaces. Thus, on one hand, the dust cannot adhere to the surface of the washer facing outwardly and, at the same time, its surface facing inwardly satisfies the following conditions:

It is very hard, so as to resist the friction exerted by the rings 12 and 13;

It cannot be oxidized and it resists the action of moist and corrosive atmospheres, even at raised temperature;

It has a very low frictional coefficient;

Lastly, the system thus executed is associated with all the desired positioning means, whereby the different parts assume the accurate relative positions, said means including e. g.:

On one hand, abutment annuli 19 and 20 cooperating respectively with the inner race 5 of the ball bearing and on the other hand with the washer 10, both annuli engaging corresponding grooves in the shaft 3.

On the other hand, a spacing sleeve 21 made of lubricant-resisting plastic material fitted with a slight tight fit over the shaft 3 and compressed in the mounting between the washer 10 and the ball bearing 4—5—6.

This manner of mounting the different parts allows fitting the ball bearing over the shaft 3 without any risk of the inner race 5 revolving, since the latter is held in position by the friction exerted by the sleeve 21.

I obtain thus an arrangement operating, when properly positioned, in the following manner:

In the first place, the operative conditions for the ball bearing are satisfied in the best manner by a reduced clamping action as produced by the elastic fitting of the sleeve 7 inside its housing 2. The elasticity of said sleeve 7 damps the shocks and allows the bearings of any type to rock slightly without leading to any exaggerated straining in the case of a lack of parallelism due to any manufacturing allowances between the bores in the two associated housings or ferrules 2.

Lastly, the fluid-tight means described are particularly efficient inasmuch as they oppose the entrance of dust and the like material by reason of the presence of rings 12 and 13 and of the dust-collecting chamber defined by the latter, the whole arrangement producing furthermore frictional stresses which are small. It should be remarked that the passage of dust from one chamber to the other is opposed all the more energetically when, by reason of the electrostatic action produced by the friction of the rings on the washer, the dust has a tendency to adhere to the rubber walls or diaphragms defining the dust-collecting chambers.

By reason of said protection, it is possible to obtain a permanent and efficient lubrication of the bearings without it being generally necessary to provide a special lubricating system. Said bearings are filled, prior to their mounting, with a suitable amount of lubricant, whereby they may remain operative for a very long time, without any further lubrication. At the end of such a very long time, the conveyor rollers are removed and taken to the workshop, where they are dismantled, this being a rapid operation by reason of the possibility of easily mounting and dismantling the bearings with reference to their housings 2; this being done, the parts are cleaned and lubricated through the introduction of a fresh load of lubricant. It is of interest to select for this purpose a moisture-proof anti-oxidizing grease.

It is, however, possible to provide a lubricating system for the actual bearings, as illustrated in Figs. 4 to 7 relating to two different embodiments of such a lubricating system.

Fig. 4 shows a lubricant system including a feeding channel 22 provided axially of the shaft and opening radially inside the corresponding notches 24 of a ring 23 (Figs. 5 and 6) fitted between the sleeve 21 and the actual bearing, the lubricant passing through said notches 24 towards the surfaces to be lubricated. In the modification illustrated in Fig. 7, the wall of the housing 2 extends inwardly in the shape of a sheath 25 surrounding the shaft 3 and the lubricating channel 22 extending through said shaft 3 opens radially at points 26 of the surface of said shaft on the inner end of the bearing, in register with the sheath 25.

Fig. 3 illustrates a further embodiment of the invention, according to which the frictionally acting washer 10 is adapted to move with the roller 1—2 while the fluid-tight rings 12 and 13 are permanently secured to the shaft 3, the diaphragms 14 and 15 engaging the said rings being for instance rigid with a part 27, made of plastic or elastic material, which part may be in one, if required, with the sleeve 21.

It should also be mentioned that the idea of fluidtight means submitted to an elastic pressure by a diaphragm of plastic or elastic material, forms one of the features of the invention, even if only a single fluidtight area is provided instead of a multiple fluidtight area as in the case of the dual ring system 12—13 described above.

The bearings may obviously be of any suitable type and, for instance, Fig. 8 illustrates the case of a roller bearing $4_1$—$5_1$—$6_1$, the rollers of which are held between frustoconical races.

Consequently, whatever may be the embodiment resorted to, it is possible to design systems the operation of which appears clearly from the above disclosure, so that it is unnecessary to enter into any further detail in this respect, said arrangement showing with reference to the arrangements of the same type already in use numerous advantages such as:

That of producing perfect fluidtightness by reason of the multiple associated fluidtight means that may be used and which allow a highly efficient filtering of the dust, in addition to the electrostatic action which appears to make the dust particles adhere to the walls of the expansion chambers, which walls are assumed to be made of rubber or the like elastic material;

That of retaining said fluidtightness as time elapses, by reason, in particular, of the compensation of wear provided by the diaphragms of elastic material producing the required elastic pressure on the cooperating surfaces;

Consequently, that also of allowing operation during a long time without any upkeep, even in the presence of atmospheres which are highly laden with dust and/or are corrosive;

That of producing only small resistant torques by reason of the reduction in friction obtained more particularly by the use of carbon, felt, nylon and the like rings contacting with extremely smooth surfaces;

That of leading to a great facility in the mounting and in the dismantling of the bearings;

And that of ensuring an excellent elastic suspension of the bearings, whereby the latter are protected against shocks and misalignment.

Obviously, and as already mentioned hereinabove, my invention is by no means limited to the applications and embodiments of its various parts which have been more specially disclosed and it covers, on the contrary, all the modifications thereof falling within the scope of accompanying claims.

What I claim is:

1. For use in connection with a structure including an inner body, a bearing mounted on said inner body and an outer body resting on said bearing so as to be rotatable with respect to said inner body about the axis of said bearing, a device for preventing dust and the like from reaching said bearing from one side thereof which comprises, in combination, a circular member carried by one of said bodies with its center on said bearing axis, means for preventing rotation of said member with respect to said last mentioned body, said member being located on said side of said bearing and having an operative surface transverse to said bearing axis at least two rings of different respective diameters coaxial with said member and each slidably engaging through one of its side surfaces said operative surface of said member and two coaxial annular resilient diaphragms interposed between the other of said bodies on the one hand and said rings respectively on the other hand for urging said side surfaces of said rings against said operative surface and defining between themselves an annular dust-collecting chamber separated by said diaphragms both from the external atmosphere and from a closed space adjoining said bearing on said side thereof.

2. For use in connection with a structure including an inner body, a bearing mounted on said inner body and an outer body resting on said bearing so as to be rotatable with respect to said inner body about the axis of said bearing, a device for preventing dust and the like from reaching said bearing from one side thereof which comprises, in combination, a circular member carried by one of said bodies with its center on said bearing axis, means for preventing rotation of said member with respect to said last mentioned body, said member being located on said side of said bearing and having an operative surface transverse to said bearing axis, at least two rings of different respective diameters coaxial with said member and each slidably engaging through one of its side surfaces said operative surface of said member, an annular part of a resilient material fixed to the other of said bodies and two annular diaphragms integral with said annular part and extending therefrom laterally, the free peripheries of said diaphragms being fixed to said rings respectively for urging said side surfaces thereof against said operative surface of said member, these diaphragms thus defining between them an annular dust collecting chamber separated by said diaphragms both from the external atmosphere and from a closed space adjoining said bearing on one side thereof.

3. A device according to claim 2 in which said two rings are made of different materials.

4. A device according to claim 2 in which the ring of greater diameter is made of graphite and the ring of smaller diameter is made of felt.

5. A device according to claim 2 in which said annular part of a resilient material is mounted to form a resilient cushion between said bearing and said outer body.

References Cited in the file of this patent

UNITED STATES PATENTS

| 2,179,824 | Kip | Nov. 14, 1939 |
| 2,465,785 | Berno | Mar. 29, 1949 |
| 2,641,515 | Bankauf et al. | June 9, 1953 |
| 2,647,025 | Deffenbaugh | July 28, 1953 |

FOREIGN PATENTS

| 138,759 | Australia | Sept. 19, 1950 |
| 848,463 | France | Oct. 31, 1939 |